(12) United States Patent
Lewin et al.

(10) Patent No.: US 6,829,252 B1
(45) Date of Patent: *Dec. 7, 2004

(54) DIGITAL SUBSCRIBER LINE ACCESS MULTIPLEXER FOR USE WITH ETHERNET OVER VDSL TRANSPORT FACILITY

(75) Inventors: Amit Lewin, Tel Aviv (IL); Yuri Poddobny, Herzelia (IL)

(73) Assignee: 3Com Corporation, Santa Clara, CA (US)

( * ) Notice: Subject to any disclaimer, the term of this patent is extended or adjusted under 35 U.S.C. 154(b) by 767 days.

This patent is subject to a terminal disclaimer.

(21) Appl. No.: 09/638,318

(22) Filed: Aug. 14, 2000

Related U.S. Application Data (63) Continuation-in-part of application No. 09/320,854, filed on May 26, 1999, now Pat. No. 6,587,476.

(51) Int. Cl.⁷ .................................................. H04J 3/16
(52) U.S. Cl. ........................ 370/493; 370/467; 375/222; 709/236
(58) Field of Search ................................ 370/493, 351, 370/352, 389, 395.52, 395.53, 401, 466, 467, 469, 480, 229, 353–356, 400, 386, 397, 465, 470, 474; 375/219, 222, 260; 709/236

(56) References Cited

U.S. PATENT DOCUMENTS

| | | | | |
|---|---|---|---|---|
| 5,936,963 A | * | 8/1999 | Saussy | 370/447 |
| 6,088,368 A | * | 7/2000 | Rubinstain et al. | 370/480 |
| 6,088,430 A | * | 7/2000 | McHale | 379/93.28 |
| 6,400,729 B1 | * | 6/2002 | Shimadoi et al. | 370/466 |
| 6,477,595 B1 | * | 11/2002 | Cohen et al. | 710/105 |
| 6,539,488 B1 | * | 3/2003 | Tota et al. | 713/400 |
| 6,580,751 B1 | * | 6/2003 | Gardner et al. | 375/222 |
| 6,587,476 B1 | * | 7/2003 | Lewin et al. | 370/467 |
| 6,608,834 B1 | * | 8/2003 | Lewin et al. | 370/395.53 |

OTHER PUBLICATIONS

U.S. patent application Ser. No. 09/320,854, Lewin et al., filed May 26, 1999.
U.S. patent application Ser. No. 09/315,215, Lewin et al., filed May 19, 1999.
Woodyard, Chris, "Hotels Fired Up To Get Wired Up; Industry Rushes To Please Laptop–toting Guests Who Want Fast Track To Web", USA Today, Sep. 2, 1999, pp. 1–4.
Terrero, Ruthane, "Hotel Management Company Has Launched High–Speed Internet Provider", Hotel Business vol. 8, No. 17, Sep. 7–20, 1999.
Aber, Robyn, "xDSL: Local Loop Access Technology", 3com Technical Papers, 1997, pp. 1–14.
RJ–017 ChipBridge, Rad Data Communications Ltd. Data Sheet, 1999, pp. 1–27.
GT–482xx, Galileo Technology Data Sheet, Revision 1.2, Jan. 27, 1999, pp. 1–46.
BCM6010 Data Sheet, Broadcom Corporation, 1998.

* cited by examiner

Primary Examiner—Brian Nguyen
(74) Attorney, Agent, or Firm—Howard Zaretsky

(57) ABSTRACT

A digital subscriber line access multiplexer (DSLAM) adapted for use with an Ethernet over Very High Speed Digital Subscriber Line (VDSL) transport facility. The DSLAM connects to a plurality of CPE devices on one end and to a high speed Ethernet link on the other. The DSLAM is adapted to receive HDLC protocol formatted VDSL frames, extract Ethernet frames therefrom and generate standard Ethernet signals for transmission overran Ethernet connection. Standard Ethernet frames are received from a Fast Ethernet input signal and encapsulated in HDLC frames for transmission over the VDSL facility to a particular CPE. The voice signal from a conventional telephone set is combined with the VDSL data signal. The combined signal is split at the DLSAM into separate voice and data signals. The Ethernet frame data is extracted from the HDLC frames and input to the Ethernet switch. The voice signal is forwarded to a conventional PBX.

29 Claims, 6 Drawing Sheets

DIGITAL SUBSCRIBER LINE ACCESS MULTIPLEXER FOR USE WITH ETHERNET OVER VDSL TRANSPORT FACILITY

REFERENCE TO RELATED APPLICATIONS

This application is a Continuation-In-Part of U.S. application Ser. No. 09/320,854, filed May 26, 1999, now U.S. Pat. No. 6,587,476, entitled "Ethernet Frame Encapsulation Over VDSL Using HDLC," incorporated herein by reference in its entirety.

FIELD OF THE INVENTION

The present invention relates generally to telecommunication systems and more particularly relates to a digital subscriber line access multiplexer (DSLAM) adapted for use with an Ethernet over Very High Speed Digital Subscriber Line (VDSL) transport facility.

BACKGROUND OF THE INVENTION

There is a growing need among both individuals and enterprises for access to a commonly available, cost effective network that provides speedy, reliable services. There is high demand for a high-speed data network, one with enough bandwidth to enable complex two-way communications. Such an application is possible today if, for example, access is available to a university or a corporation with sufficient finances to build this type of network. But for the average home computer user or small business, access to high speed data networks is expensive or simply impossible. Telephone companies are therefore eager to deliver broadband services to meet this current explosion in demand.

One of the problems is that millions of personal computers have found their place in the home market. Today, PCs can be found in approximately 43% of all United States households and a full 50% of United States teenagers own computers. Virtually every PC sold today is equipped with a modem, enabling communication with the outside world via commercial data networks and the Internet. Currently, people use their PCs to send and receive e-mail, to access online services, to participate in electronic commerce and to browse the Internet. The popularity of the Internet is such that there are an estimated 50 million users around the globe. These figures indicate that in the past few years the personal computer has fueled a dramatic increase in data communications and the corresponding demands on the data networks that carry the traffic.

The Internet serves as a good example of the increased demands that have been placed on data networks. At first, Internet access consisted of text only data transfers. Recently, with the popularity of the World Wide Web (WWW) and the construction of numerous sites with high quality content, coupled with the development of Internet browsers such as Mosaic, Netscape Navigator and Microsoft Explorer, the use of graphics, audio, video and text has surged on the Internet. While graphics, audio and video make for a much more interesting way to view information as opposed to plain text, bandwidth consumption is significantly increased. A simple background picture with accompanying text requires approximately ten times the bandwidth needed by text alone. Real-time audit and streaming video typically need even more bandwidth. Because of the increased requirement for bandwidth, activities such as browsing home pages or downloading graphics, audio and video files can take a frustratingly long period of time. Considering that the multimedia rich World Wide Web accounts for more than one quarter of all Internet traffic, it is easy to see why the demand for bandwidth has outpaced the supply. In addition, the creative community is pushing the envelope by offering audio and full motion video on numerous sites to differentiate themselves from the millions of other sites competing for maximum user hits.

As use of the Internet and online services continues to spread, so does the use of more complex applications, such as interactive video games, telecommuting, business to business communications and video conferencing. These complex applications place severe strains on data networks because of the intensive bandwidth required to deliver data-rich transmissions. For example, a telecommuter who requires computer aided design (CAD) software to be transported over the data network requires a high-bandwidth data pipeline because of the significant size of CAD files. Similarly, a business-to-business transaction in which large database files containing thousands of customer records are exchanged also consumes large amounts of bandwidth. The same is true for users seeking entertainment value from sites offering high quality video and audio. The lack of available bandwidth in today's data networks is the primary barrier preventing many applications from entering mainstream use. Just as processing power limited the effectiveness of early PCs, bandwidth constraints currently limit the capabilities of today's modem user Considering the networking needs of hotel guests, the vast majority of hotel guests are currently forced to use conventional dial up connections at relatively slow data rates. A recent trend in the industry is to try to accommodate guest's networking needs and their desires for fast Internet access by installing in-room data ports and increasing the capacity of hotel PBX systems and trunk lines. Despite the equipment and facility upgrades, however, the typical PBX cannot support laptop speeds of 56 kbps. The best most PBX systems can handle is 14.4 kbps speeds. Which such slow connectivity, guests quickly become frustrated and the hotel PBX is crippled when stretched to capacity during peak usage hours. Having guests log in over dial up lines, burdens the hotel's switchboard which may get tied up in knots for hours due to a large number of guests on-line simultaneously. The problem is so bad that, in response, some hotel chains add on extra telephone charges to guests' bills for local calls longer than a half hour.

The current situation is, therefore, unacceptable in the fast paced environment of today, particularly for the business traveler. The demand for high speed Internet access in hotel guest rooms is growing rapidly, especially when considering most hotel guests are already used to fast Internet access in their homes and offices.

Further, the demand for faster Internet access is growing at hotel meeting and convention facilities. Meeting attendees and tradeshow exhibitors are increasingly requesting fast access service. It is thus expected that in the future, high speed Internet access will become a standard for any hotel catering to the business and convention traveler, in addition to an increasing number of leisure travelers.

Some currently used methods of accessing the Internet are described below, beginning with the common POTS method, Most computer modem users currently access data through the standard telephone network, known as plain old telephone service (POTS). Even when equipped with today's speediest modems, dial up modems on a POTS network can access data only at a rate of 28.8, 33.6 or 56 Kbps. Dial up modem transmission rates have increased significantly over the last few years, but POTS throughput is ultimately limited to 64 Kbps. While this rate may be acceptable for some limited applications like e-mail, it is a serious bottleneck for more complex transactions, such as telecommuting, video conferencing or full-motion video viewing. To illustrate, full motion video compressed, using the Motion Picture Entertainment Group (MPEG)-2 standard requires a data stream or approximately 6 Mbps, or roughly 208 times the throughput of a 28.8 Kbps modem. Thus, using today's dial up modems, it would take more than 17 days to capture two hours of video. As bandwidth demands continue to grow, providers search for better ways to offer high speed data access. Further complicating the problem is the need to deliver all these complex services at an affordable price.

Today's most popular data access method is POTS. But as discussed previously, POTS is limited when it comes to large data transfers. An alternative to POTS currently available is Integrated Services Digital Network (ISDN). In the past few years, ISDN has gained momentum as a high-speed option to POTS. ISDN expands data throughput to 64 or 128 Kbps, both from the network to the user (i.e. enterprise, hotel, home, etc.) and from the user back to the network, and can be technically made available throughout much of the United States and in many other parts of the globe. Similar to POTS, ISDN is a dedicated service, meaning that the user has sole access to the line thus preventing other ISDN users from sharing the same bandwidth. ISDN is considered an affordable alternative, and in general, ISDN is a much better solution for applications such as Web browsing and basic telecommuting. However, like POTS, ISDN is severely limited in applications such as telecommuting with CAD files and full-motion video viewing. The latter requires roughly 39 times the throughput than that provided by ISDN.

Multichannel multipoint distribution service (MMDS), a terrestrial microwave wireless delivery system, and direct broadcast satellite (DBS), such as DirecTv and US Satellite Broadcasting (USSB), are wireless networks. They both deliver high bandwidth data streams to the home, referred to as downstream data, but neither has a return channel through which data is sent back over the network, referred to as upstream data. Although it is a relatively affordable system to deploy for broadcast applications, because it requires no cable wires to be laid, it falls short in interactive access. In order to use a wireless system for something as basic as e-mail, an alternate technology such as a telephone line must be used for the upstream communications.

Another available network delivery system is asymmetric digital subscriber line (ADSL). Offering a downstream capacity of 6 Mbps or more to the home, ADSL has the downstream capacity to handle the most complex data transfers, such as full motion video, as well as an upstream capacity of at least 500 Kbps. However, due to its limitation of upstream bandwidth capacity, it essentially is a single service platform. Also, since it has to overcome the challenge of reusing several thousand feet of existing twisted pair wiring, the electronics required at each end of the cable are complex, and therefore currently very expensive.

Hybrid fiber coax (HFC), a network solution offered by telephone and cable companies, is yet another option for delivering high bandwidth to users that is known in the art. However, HFC has limitations in that HFC networks provide a downstream capacity of approximately 30 Mbps, which can be shared by tip to 500 users. Upstream bandwidth is approximately 5 Mbps and is also shared. A disadvantage with HFC is that shared bandwidth and limited upstream capacity become serious bottlenecks when hundreds of users are simultaneously sending and receiving data on the network, with service increasingly impaired as each user tries to access the network.

It is a current trend among telephone companies around the world to include existing twisted pair copper loops in their next generation broadband access networks. Hybrid Fiber Coax (HFC), a shared access medium well suited to analog and digital broadcast, comes up short when utilized to carry voice telephony, interactive video and high speed data communications at the same time.

Fiber to the home (FTTH) is still prohibitively expensive in the marketplace that is soon to be driven by competition rather than costs. An alternative is a combination of fiber cables feeding neighborhood Optical Network Units (ONUs) and last leg premises connections by existing or new copper. This topology, which can be called fiber to the neighborhood (FTTN), encompasses fiber to the curb (FTTC) with short drops and fiber to the basement (FTTB), serving tall buildings with vertical drops.

One of the enabling technologies for FTTN is very high rate digital subscriber line (VDSL). VDSL is an emerging standard that is currently undergoing discussion in ANSI and ETSI committees. The system transmits high-speed data over short reaches of twisted pair copper telephone lines, with a range of speeds depending upon actual line length.

An important part of a network that supports Ethernet transport over VDSL, is a device adapted to extract the Ethernet signal and couple this signal to a high speed Ethernet connection. It is thus desirable to employ a device with the capability of transmitting and receiving Ethernet over VDSL on a plurality of channels.

Digital Subscriber Line Access Multiplexers (DSLAMs) are known in the art. Currently available DSLAMs, however, do not have the capability of switching a plurality of Ethernet channels. An external device must be employed to perform any desired Ethernet switching. It is thus desirable to have a DSLAM device that incorporates a means of transporting Ethernet frame data over a VDSL transport facility and that incorporates the capability of switching multiple Ethernet channels. In addition, the DSLAM device should have the capability of encoding and decoding Ethernet data as HDLC and encapsulating and extracting the encoded data within VDSL.

SUMMARY OF THE INVENTION

The present invention is a digital subscriber line access multiplexer (DSLAM) adapted for use with an Ethernet over Very High Speed Digital Subscriber Line (VDSL) transport facility. The invention utilizes the widely known HDLC communications protocol to encapsulate Ethernet frames for transmission over the VDSL transport facility of the invention. The HDLC protocol formatted VDSL frames are transmitted over a plurality of point to point VDSL links to CPEs where they are subsequently extracted and forwarded as standard Ethernet frames. In the reverse direction, the DSLAM extracts the Ethernet signals from the plurality of CPEs and forwards the Ethernet signals to an integral Ethernet switch.

The VDSL facility transport system comprises an Ethernet to VDSL Customer Premises Equipment (CPE) coupled to a DSL Access Multiplexer (DSLAM) over a VDSL transport facility. The DSLAM is typically located at the curb or before the 'last mile' in a subscriber loop. The Ethernet to VDSL CPE functions to receive a 10BaseT Ethernet signal and encapsulate the Ethernet frame into a VDSL frame for transmission over the VDSL facility.

Likewise, the Ethernet to VDSL CPE also functions to receive a VDSL signal, extract Ethernet frames therefrom and output them as standard 10BaseT Ethernet signals.

The DSLAM is adapted to receive VDSL frames, extract Ethernet frames therefrom and generate standard Ethernet signals. These standard Ethernet signals are then input to an onboard Ethernet switch. Likewise, the DSLAM is also adapted to receive standard Ethernet frames from a Fast Ethernet input signal and encapsulate them in VDSL frames for transmission over the VDSL facility to a particular CPE.

Both the CPE and DSLAM perform Ethernet encapsulation and extraction whereby the Ethernet frames are stored and forwarded in both directions. Interface circuitry couples the transmit and receive frame data to and from the VDSL channel.

The system comprises means for combining the voice signal from conventional telephone sets with the VDSL data signal. The combined signal is subsequently split at the DLSAM into separate voice and data signals. The VDSL data signal is processed to extract the Ethernet signal which is then input to an Ethernet switch. The voice signal is forwarded to a conventional PBX.

Note that the present invention has applicability to several types of products and applications and is particularly suitable for use with traveling or mobile users, the hospitality market including hotels and motels and Multi Dwelling Units (MDUs).

There is thus provided in accordance with the present invention a Digital Subscriber Line Access Multiplexer (DSLAM) apparatus for use in an Ethernet over a Very high speed Digital Subscriber Line (VDSL) transport facility, the DSLAM connected to a plurality of Customer Premise Equipment (CPE), each CPE connected to the DSLAM via a separate VDSL channel comprising a plurality of channel circuits, each channel circuit corresponding to a channel and comprising an analog front end operative to provide a line interface to a VDSL channel, a VDSL transceiver, an Ethernet bridge adapted to bridge Ethernet transmit and receive signals to and from the VDSL transceiver, respectively, an Ethernet switch having a plurality of ports, each port coupled to a channel circuit, an Ethernet port coupling the Ethernet switch to an external Local Area Network (LAN), a processor and software means operative on the processor for managing and controlling the plurality of channel circuits; the Ethernet switch and the Ethernet port.

BRIEF DESCRIPTION OF THE DRAWINGS

The invention is herein described, by way of example only, with reference to the accompanying drawings, wherein.

DETAILED DESCRIPTION OF THE INVENTION

NOTATION USED THROUGHOUT

The following notation is used throughout this document.

| Term | Definition |
| --- | --- |
| ADSL | Asymmetric Digital Subscriber Line |
| ANSI | American National Standards Institute |
| CAD | Computer Aided Design |
| CAP | Carrierless Amplitude Modulation/Phase Modulation |
| CPE | Customer Premise Equipment |
| CPU | Central Processing Unit |
| CRC | Cyclic Redundancy Check |
| DBS | Direct Broadcast Satellite |
| DSL | Digital Subscriber Loop |
| DSLAM | Digital Subscriber Line Access Multiplexer |
| EPROM | Eraseable Programmable Read Only Memory |
| ETSI | European Telecommunications Standards Institute |
| FDM | Frequency Division Multiplexing |
| FEXT | Far End Crosstalk |
| FFE | Feed Forward Equalization |
| FIFO | First In First Out |
| FTTB | Fiber to the Building |
| FTTC | Fiber to the Curb |
| FTTCab | Fiber to the Cabinet |
| FTTEx | Fiber to the Exchange |
| FTTH | Fiber to the Home |
| FTTN | Fiber to the Node |
| HFC | Hybrid Fiber Coax |
| IFG | Interframe Gap |
| IP | Internet Protocol |
| ISDN | Integrated Services Digital Network |
| LED | Light Emitting Diode |
| LMA | Local Management Application |
| MDU | Multiple Dwelling Unit |
| MII | Media Independent Interface |
| MMDS | Multichannel Multipoint Distribution Service |
| MPEG | Motion Picture Entertainment Group |
| NEXT | Near End Crosstalk |
| ONU | Optical Network Unit |
| PBX | Private Branch Exchange |
| PC | Personal Computer |
| PLD | Programmable Logic Device |
| PLS | Physical Layer Signaling |
| POTS | Plain Old Telephone Service |
| QAM | Quadrature Amplitude Modulation |
| QoS | Quality of Service |
| RAM | Random Access Memory |
| RF | Radio Frequency |
| RFI | Radio Frequency Interference |
| SDRAM | Synchronous Dynamic Random Access Memory |
| SNMP | Simple Network Management Protocol |
| SOC | Start Of Cell |
| SOF | Start Of Frame |
| TCP | Transmission Control Protocol |
| TFTP | Tiny File Transfer Protocol |
| UART | Universal Asynchronous Receiver Transmitter |
| UI | User Interface |
| USSB | US Satellite Broadcasting |
| UTP | Unshielded Twisted Pair |
| VDSL | Very High Speed Digital Subscriber Line |
| WWW | World Wide Web |

GENERAL DESCRIPTION

The present invention is a digital subscriber line access multiplexer (DSLAM) adapted for use with an Ethernet over Very High Speed Digital Subscriber Line (VDSL) transport facility. The invention utilizes the widely known HDLC communications protocol to encapsulate Ethernet frames for transmission over the VDSL transport facility. The HDLC protocol formatted VDSL frames are transmitted over a plurality of point to point VDSL links to CPEs where they are subsequently extracted and forwarded as standard Ethernet frames. In the reverse direction, the DSLAM extracts the Ethernet signals from the plurality of CPEs and forwards the Ethernet signals to an integral Ethernet switch with a 100Base-T uplink.

The VDSL transport facility is described in more detail in U.S. Pat. No. 6,680,940, entitled "A System for Transporting Ethernet Frames Over Very High Speed Digital Subscriber Lines," incorporated herein by reference in its entirety.

As used throughout this document, the term HDLC frame denotes a frame of data having a variable length that is transmitted over the VDSL transport facility. The HDLC frame appears on the line as a VDSL standard compatible analog signal representing the contents of the HDLC frame. The length of the HDLC frame varies in accordance with the length of the Ethernet frame encapsulated within. The HDLC frame of the present invention bears no relationship and should not be confused with the VDSL frame having a fixed length of 405 bytes as described in the VDSL Draft Specification published by the ANSI TIE1.4 Subcommittee.

Figure 1:
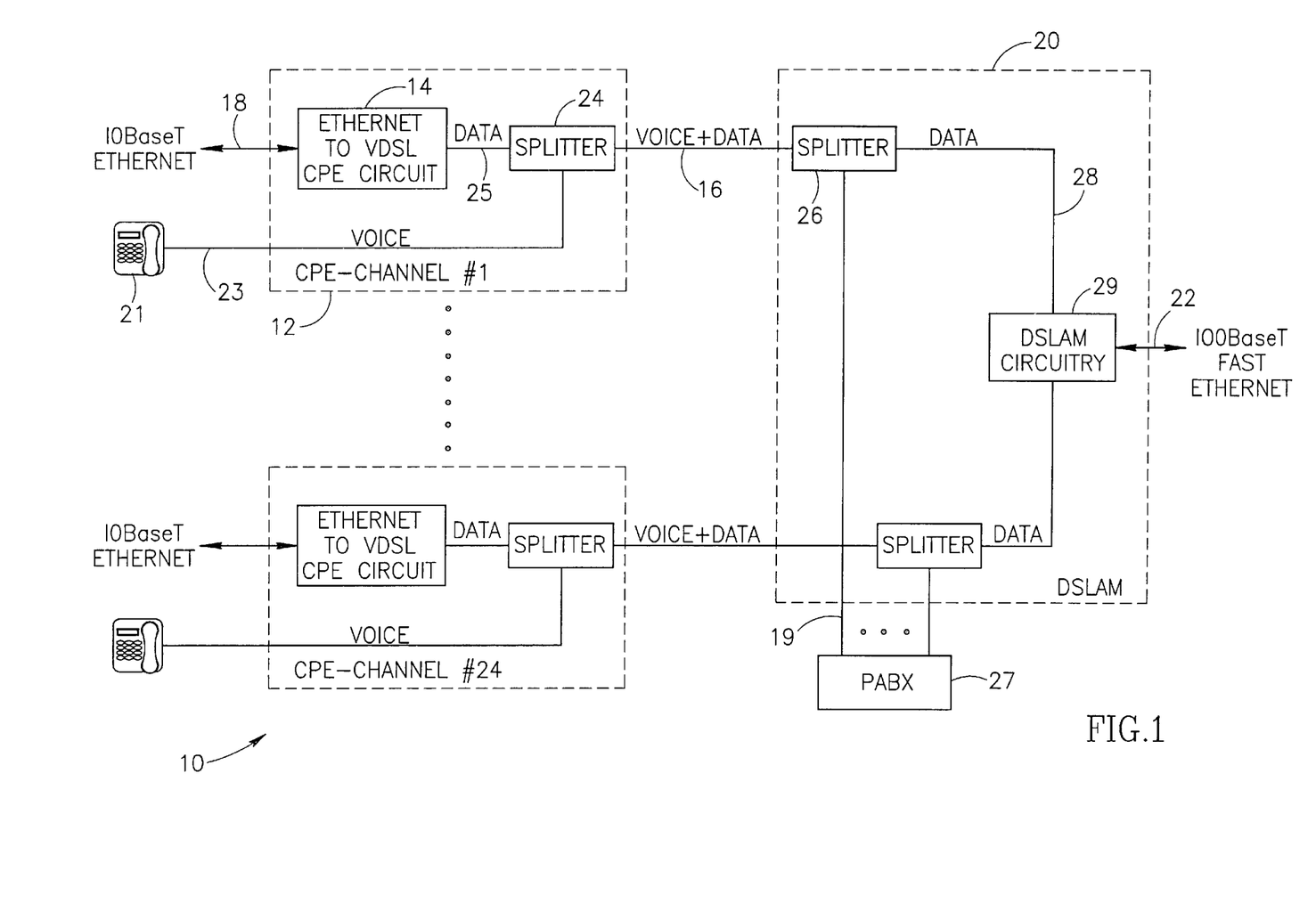
FIG. 1 is a block diagram illustrating a plurality of Ethernet to VDSL CPEs coupled to a DSLAM over a VDSL transport facility that utilizes the HDLC protocol.

A block diagram illustrating a plurality of Ethernet to VDSL CPEs coupled to a DSLAM over a VDSL transport facility that utilizes the HDLC protocol is shown in FIG. 1. The system, generally referenced 10, comprises one or more channels 12 labeled channel #1 through channel #24. Note that a DSLAM comprising 24 channels is presented as an example and that it is not intended that the present invention be limited to any particular number of channels. DSLAMs having any number of channels may be constructed without departing from the scope of the invention.

Each channel comprises an Ethernet to VDSL Consumer Premises Equipment (CPE) circuit 14 and a splitter 24. The Ethernet to VDSL CPE circuit 14 is coupled to an Ethernet source 18 on one side and to the splitter 24 on the other. The splitter is connected to a conventional telephone set 21 and to the data signal 25 output of the CPE circuit 14. The splitter functions to combine the data signal 25 and voice signal 23 into a composite voice+data signal 16, in one direction and to split the voice+data signal into separate voice and data signals in the reverse direction.

Each channel 12 is coupled, via their respective VDSL facilities 16 to a DSL Access Multiplexer (DSLAM) 20. The DSLAM 20 comprises complementary splitters 26, each functioning to split the received voice_data signal into a separate voice signal 19 and data signal 28. The voice signal is forwarded to a conventional PBX 27 and the data signal is input to the DSLAM circuitry 29. The DSLAM 20 is coupled to a Fast Ethernet source 22, e.g., 100BaseTx or 100BaseFx Ethernet source.

Each Ethernet to VDSL CPE 14 functions to receive a 10BaseT Ethernet signal 18 and encapsulate the Ethernet frame into an HDLC frame for transmission over the VDSL facility 16. Likewise, the Ethernet to VDSL CPE 14 also functions to receive an HDLC formatted signal over the VDSL facility and extract Ethernet frames therefrom for output as standard 10BaseT Ethernet signals 18.

The DSLAM 20 is adapted to receive HDLC frames, extract Ethernet frames therefrom and generate standard Ethernet signals. The Ethernet signals are input to an Ethernet switch with a Fast Ethernet uplink port 22. Likewise, the DSLAM 20 is also adapted to receive standard Ethernet frames from the Fast Ethernet signal 22 and encapsulate them in HDLC frames for transmission over the VDSL facility 16 to one of the CPE channels 12.

The VDSL facility 16 may comprise any suitable transport facility that is capable of transporting 10BaseT Ethernet data from one point to another. Preferably the VDSL facility conforms to the VDSL standard which is currently a draft specification being formulated by the ANSI T1E1.4 Technical Subcommittee.

A transport facility suitable for use with the present invention is the 10BaseS transport facility described in detail in U.S. Pat. No. 6,088,368, entitled 'Ethernet Transport Facility Over Digital Subscriber Lines,' incorporated herein by reference in its entirety. A brief description of the 10BaseS transmission system disclosed therein is presented below.

The 10BaseS transport facility is capable of transmitting 10 Mbps Ethernet over existing copper infrastructure. The system is adapted to transmit and receive carrierless amplitude and phase modulation (CAP) which is a version of suppressed carrier quadrature amplitude modulation (QAM). Alternatively, the system is adapted to transmit and receive conventional quadrature amplitude modulation (QAM). QAM is the most commonly used form of high speed modulation over voice telephone lines. The system also utilizes frequency division multiplexing (FDM) to separate downstream channels from upstream channels. In addition, FDM is also used to separate both the downstream and the upstream channels from POTS and ISDN signals. A substantial distance in frequency is maintained between the lowest data channel and POTS frequencies to permit the use of very simple and cost effective POTS splitters, which are actually splitters/combiners. The upstream channel is placed above the downstream channel in frequency. The downstream and upstream data channels are separated in frequency from bands used for POTS and ISDN, enabling service providers to overlay 10BaseS on existing services.

The 10BaseS transport facility can deliver symmetrical data at 11.78 Mbps (net 10.6 Mbps) over unshielded twisted pair (UTP) telephone wires originally intended for bandwidths of between 300 Hz and 3.4 KHz. QAM modulation and blind equalization are used to achieve a high transmission speed over existing copper infrastructure. In addition, the system is able to cope with several sources of noise such as impulse noise, e.g., POTS transients, radio frequency interference (RFI) noise and crosstalk noise, i.e., both near end crosstalk (NEXT) and far end crosstalk (FEXT). In terms of RF emissions, the system can operate using underground cabling as well as overhead distribution cabling.

Figure 2:
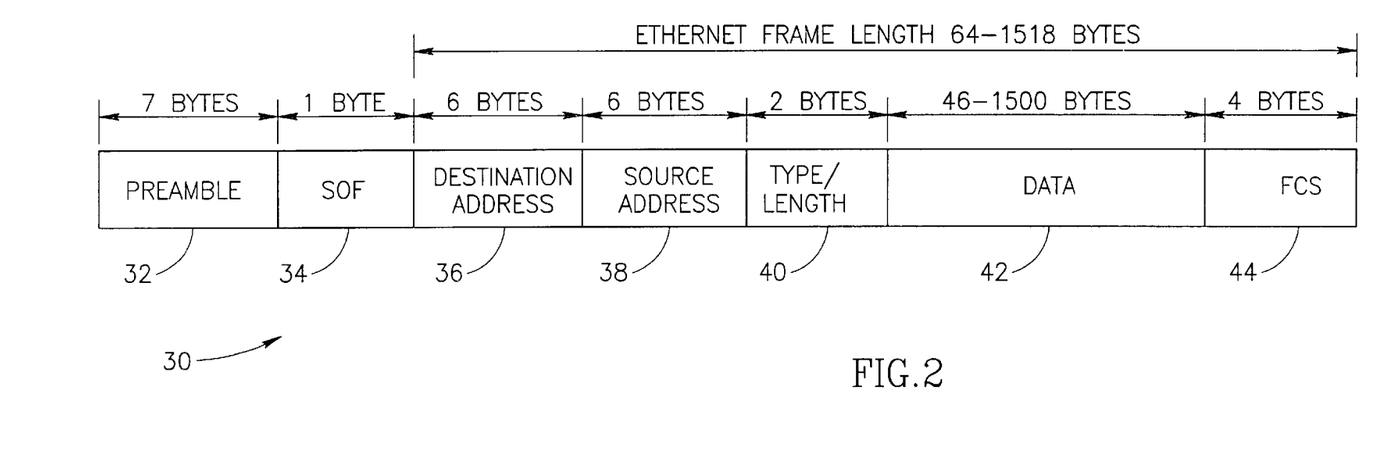
FIG. 2 is a diagram illustrating the format of a standard Ethernet frame.

A diagram illustrating the format of a standard Ethernet frame is shown in FIG. 2. A standard Ethernet frame, generally referenced 30, comprises a plurality of fields. The fields include a 7-byte preamble 32 consisting of 0xAA characters, a one byte Start of Frame (SOF) character 34 consisting of 0xAB, a 6-byte destination address 36, a 6-byte source address 38, 2-byte type/length 40, a data field 42 having a length from 46 to 1500 bytes, and a 4-byte Frame Check Sequence 44 that comprises a CRC check. The type/length field 40 may comprise either type or length data, depending on the variant of Ethernet used. The fields comprising the destination address 36, source address 38, type/length 40, data 42 and FCS 44 are commonly referred to as the Ethernet frame. Note that the Ethernet frame may comprise from 64 to 1518 bytes depending on the size of the data field. Data shorter than 46 bytes is padded to a minimum of 46 bytes.

In accordance with the 802.3 standard, Ethernet data is transmitted using Manchester coding whereby an idle character is transmitting using DC and a '0' and '1' characters are transmitted having a transition half way through the symbol, the transition for a '0' being opposite that for '1'.

Figure 3:
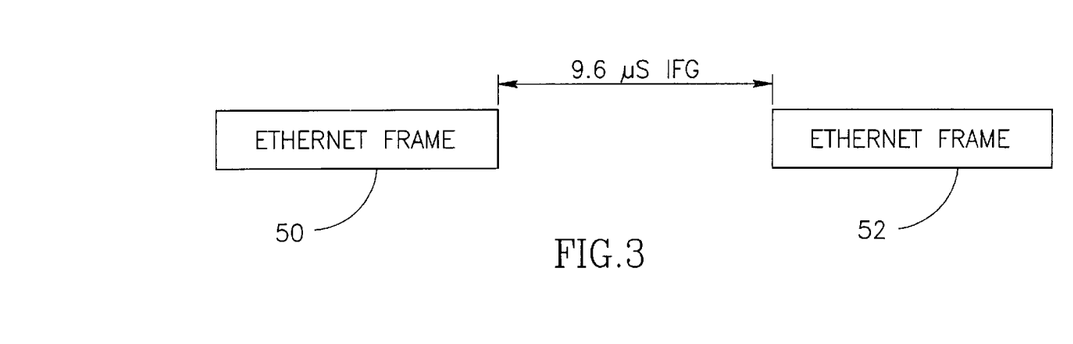
FIG. 3 is a diagram illustrating the interframe gap between two Ethernet frames.

A diagram illustrating the interframe gap between two Ethernet frames is shown in FIG. 3 The Ethernet IEEE 802.3 standard provides for a minimum Interframe Gap (IFG) of 9.6 μs between frames to facilitate collision detection and avoidance. The 9.6 μs IFG is equivalent to 12 bytes for 10 Mbps Ethernet. An example is shown whereby two Ethernet frames 50, 52 are separated by an IFG of 9.6 μs. The IFG is removed by the CPE 14 and is not transmitted over the VDSL facility. The IFG is inserted, however, when transmitting Ethernet frames constructed from HDLC frame data received over the VDSL facility.

Figure 4:
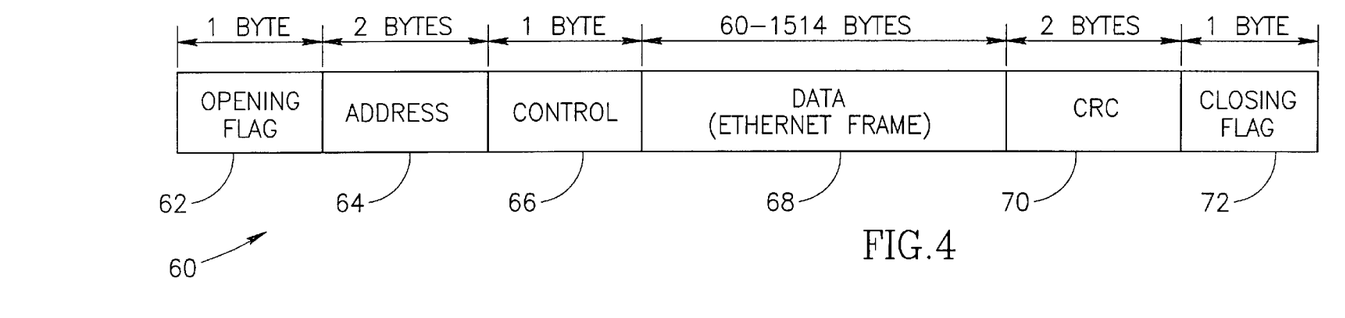
FIG. 4 is a diagram illustrating the format of HDLC frames that are transmitted over the VDSL facility.

A diagram illustrating the formal of HDLC frames that are transmitted over the VDSL facility (or 10BaseS facility) is shown in FIG. 4. The HDLC frame, generally referenced 60, comprises a 1-byte opening flag field 62, a 2-byte address field 64, a one byte control field 66, a data field 68 that may range from 60 to 1514 bytes, a 2 or 4-byte CRC check field 70 and a closing flag field 72. Note that depending on the configuration of the HDLC protocol used, the address field may be 8, 16 or 8N bits, the control field 8 or 216 bits and the CRC field 16 or 32 bits. Note that use of the address and control fields is not mandatory and may optionally not be used.

HDLC

In accordance with the present invention, Ethernet frames are encapsulated into HDLC frames and transported via the VDSL transmission facility. The High level Data Link Control (HDLC) protocol documented in ISO 3309 specifies a packetization standard for serial links. HDLC supports several modes of operation, including a simple sliding window mode for reliable delivery. Since many networks such as the Internet provide retransmission capability at the upper layers in the OSI communications stack, i.e., TCP, most Internet applications utilize the unreliable delivery mode Unnumbered Information feature of HDLC.

HDLC is one of the most common protocols used in the data link layer (layer 2) of the OSI communication stack. Many variants of HDLC have been developed. For example, PPP and SLIP protocols both utilize a subset of the functionality of HDLC. The D channel in ISDN utilizes a slightly modified version of HDLC. The default serial link encapsulation of Cisco routers is HDLC. In addition, other common Layer 2 protocols, such as SDLC, SS7, AppleTalk, LAPB and LAPD are based on HDLC and its framing structure.

Characteristic to HDPC frames are characters 0x7E or 0b 01111110 that are placed at the beginning and the end of the frame. In accordance with the protocol, flag characters may not appear in the intervening data, i.e., any data transmitted between the flag characters. To enforce this requirement, the data is modified in a transparent manner using a zero insertion/deletion process known as bit stuffing. Bit stuffing ensures that a data bit pattern matching the flag character (delimiter flag) does not occur in a field between flags. On bit synchronous links, a '0' is inserted after every sequence of five '1's . The longest sequence of '1's that may appear over the link (other than flag characters) is 0b 0111110, which is one less '1' than the flag character.

The HDLC receiver is adapted to remove the '0's inserted into the data stream. After seeing five consecutive '1's, the receiver examines the next bit. If the next bit is a '0', the bit is discarded and the frame processing continues. If the next bit is a '1', then the detection of a flag character sequence at the end of the frame is indicated.

The HDLC frame is synchronous and relies on the physical layer for clocking and synchronization of the transmitter and receiver. An address field carries the destination address of the frame because the Layer 2 frame can be sent over point to point link, broadcast networks, packet switched or circuit switched systems. The control field provides flow control number and defines the frame type , i.e., control or data. The length of the data field depends on the frame protocol. Typically, Layer 3 frames are carried in this data field. In accordance with the invention, variable length Layer 2 Ethernet frames are carried in the data field.

At the end of a frame, a Frame Check Sequence (FCS) is used to verify the integrity of the data. The FCS may be 16 or 32 bits long depending on the implementation. The FCS is a Cyclic Redundancy Check (CRC) checksum calculated using the following polynomial.

$$X^{16}+X^{12}+X^5+1 \tag{1}$$

Between the transmission of HDLC frames, the line idles. Most synchronous links constantly transmit data whereby all '1's are sent during the inter-frame periods, i.e., mark idle, or all flag characters are sent, i.e., flag idle.

The data field can have a length from 60 to 1514 bytes. To provide support for VLANs, the data field can be lengthened 4 bytes to 1518 bytes. This corresponds to the Ethernet frame being encapsulated. Note that before the Ethernet frame is encapsulated, its 4 byte FSC (CRC) field is stripped off, thus reducing the data field length by 4 bytes.

It is important to note that in accordance with the present invention, as described previously, the HDLC frame is transmitted without the use of the Tx or Rx SOC signals provided by the VDSL transceiver. In place of the SOC signals, the standard HDLC protocol performs the role of providing a means for the receiver in the VDSL transceiver to know when an HDLC frame begins.

ETHERNET TO VDSL CPE

Figure 5:
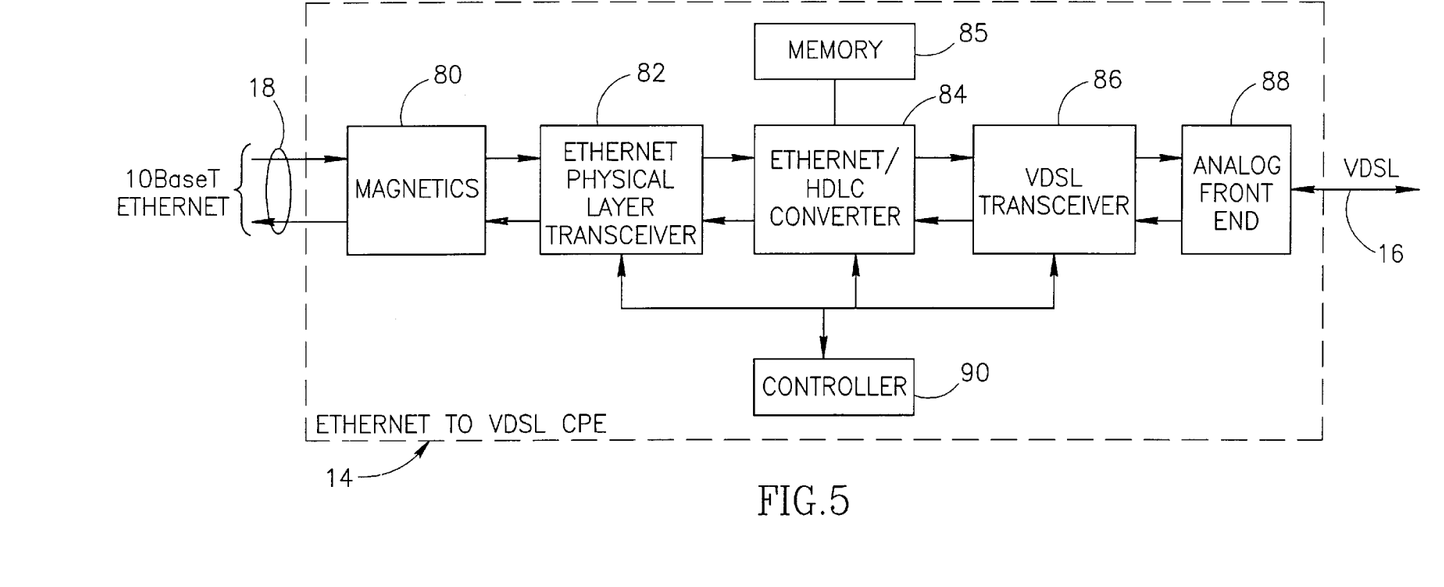
FIG. 5 is a block diagram illustrating the Ethernet to VDSL CPE in more detail.

The Ethernet to VDSL CPE unit will now be described in more detail. A block diagram illustrating the Ethernet to VDSL CPE in more detail is shown in FIG. 5. The Ethernet to VDSL CPE unit 14 functions to receive a 10BaseT Ethernet signal 18 and encapsulate the Ethernet frame into a HDLC frame for transmission over the VDSL facility. In the opposite direction, the Ethernet to VDSL CPE unit 14 functions to receive a VDSL signal in HDLC protocol format, extract Ethernet frames therefrom and output them as standard 10BaseT Ethernet signals.

The Ethernet to VDSL CPE unit 14 comprises Ethernet circuitry that includes magnetics 80 and Ethernet physical layer transceiver 82. The magnetics 80 interfaces to the 10BaseT Ethernet line 18 and generally comprises an isolation transformer and optionally one or more filters. The Ethernet physical layer transceiver 82 functions to perform the physical layer signaling (PLS) and Media Attachment Unit (MAU) functions as defined by the IEEE 802.3 specification for use with 10BaseT Ethernet networks. An Ethernet physical layer transceiver suitable for use with the present invention comprises the LXT905 10BaseT Ethernet transceiver manufactured by Level One Communications, Inc., Sacramento, Calif.

The Ethernet to VDSL CPE 14 also comprises an Ethernet/HDLC converter 84, memory 85, VDSL transceiver 86, analog front end 88 and controller 90. The output of the Ethernet physical layer transceiver 82 is input to the Ethernet/HDLC converter 84. The function of the converter is to encapsulate Ethernet frames received from the physical layer transceiver 82 into HDLC frames. In the other direction, the converter is adapted to extract Ethernet frames from the HDLC frames received from the VDSL facility. The physical layer transceiver 82 communicates with the Ethernet/HDLC converter 84 via a plurality of signal lines that comprise Tx and Rx data and control line, including clock and enable lines.

The converter 84 comprises an integral Ethernet controller to receive and transmit Ethernet frames to and from the Ethernet physical payer transceiver 82. Both the HDLC controller and the Ethernet controller can be implemented utilizing a commercially available microprocessor or microcontroller.

The controller 90 functions to control the operation of the physical layer transceiver 82, Ethernet/HDLC converter 84 and VDSL transceiver 86. The converter stores frames during the conversion process in a buffer within memory 85.

The characteristics of the standard HDLC protocol, e.g., the sync flag, are used in the present invention to provide the receiving station an indication of the start of a HDLC frame. The bit stuffing capabilities built into the HDLC controller prevent the occurrence of a sync flag in the data stream.

The receiving station performs standard HDLC reception to determine whether the preamble detected is a sync flag indicating the start of a HDLC frame. The payload of the HDLC frame carries Ethernet frame data that can range from 60 to 1514 bytes.

The output of the converter 84 is input to the VDSL transceiver 86. The VDSL transceiver 86 functions to encode the received HDLC frame bit stream into a VDSL compatible analog signal. In the opposite direction, the VDSL transceiver functions to receive the HDLC frame as an analog VDSL signal and output the HDLC in digital form.

A VDSL modem suitable for use in constructing the VDSL transceiver 86 of the present invention comprises the BCM6020 VDSL Transceiver manufactured by Broadcom Corporation, Irvine, Calif. or a VDSL modem manufactured by Savan Communications Ltd., Netanya Israel.

The output of the VDSL transceiver 86 is input to an analog front end 88. The analog front end comprises a line driver amplifier in the transmit direction, Automatic Gain Control (AGC) circuit in the receive direction, isolation transformer and hybrid filters. The analog front end 88 generates the analog VDSL signal for transmission onto the VDSL copper line 16. The analog front end provides the interface in the receive direction that functions to receive the analog VDSL signal from the VDSL copper line and pass the signal through an AGC and filters before outputting it to the VDSL transceiver 86.

The analog front end also comprises splitter means for extracting a voice signal from a combined voice+data signal. In addition, the analog front end comprises combining means for combining a data signal with a voice signal so as to generate a combined voice+data signal.

In the Ethernet to VDSL direction, Ethernet frames are received over the 10BaseT Ethernet input signal port 18 and are input to the magnetics module 80. The analog output of the magnetics is input to the Ethernet physical layer transceiver 82. The Ethernet signals are input, via Tx and Rx data and control lines, to the Ethernet/HDLC converter circuitry 84 which functions to encapsulate the Ethernet frame data received from the Ethernet port 18 into HDLC frames. The HDLC frames are then forwarded to the VDSL transceiver 86. The VDSL transceiver 86 functions to modulate the HDLC frame data and generate an analog VDSL signal that is input to the analog front end 88 which contains line drivers and filters. The signal output of the analog front end 88 is suitable for transmission over the twisted pair wire 16. Note that the HDLC frames may be transmitted using the 10BaseS transport facility described above.

In the VDSL to Ethernet direction, VDSL signals received over the twisted pair wire 16 (which may comprise 10BaseS signals) are received by the analog front end 88 which comprises an AGC circuit and one or more filters. The output of the analog front end 88 is input to the VDSL transceiver 86. The VDSL transceiver 86 functions to demodulate the analog signal received over the twisted pair wire 16 and output HDLC frames in digital form to the Ethernet/HDLC converter circuitry 84. The Ethernet/HDLC converter circuitry 84 functions to extract the Ethernet frame data encapsulated within the HDLC frame and generate standard Ethernet frames which are then forwarded to the Ethernet physical layer transceiver 82 for transmission over the 10BaseT port 18 via the magnetics module 80 which contains and isolation transformer and one or more filters.

The VDSL transceiver 86 functions to provide the clocking via TxCLK and RxCLK signals for both transmit and receive data signals TxData, RxData. In addition, the transceiver 86 provides a RxErr signal that is asserted when an error is detected in the received data. An error condition may comprise a framing error, loss of synchronization of the receive signal, etc. Further, the transceiver 86 provides a Tx and Rx Start of Cell (SOC) signal, TxSOC, RxSOC. The SOC signals, as defined in the VDSL draft standard, are suitable for use in transporting ATM cell data over VDSL and also suitable for general use in synchronizing the TxData signal input to the transceiver and the RxData output of the transceiver. The Tx and Rx SOC signals provide a pulse at the beginning of the VDSL frame. A VDSL frame comprises a fixed number of bytes, e.g., 256, which has no relation to the number of bytes in an Ethernet frame.

DSL ACCESS MULTIPLEXER

Figure 6:
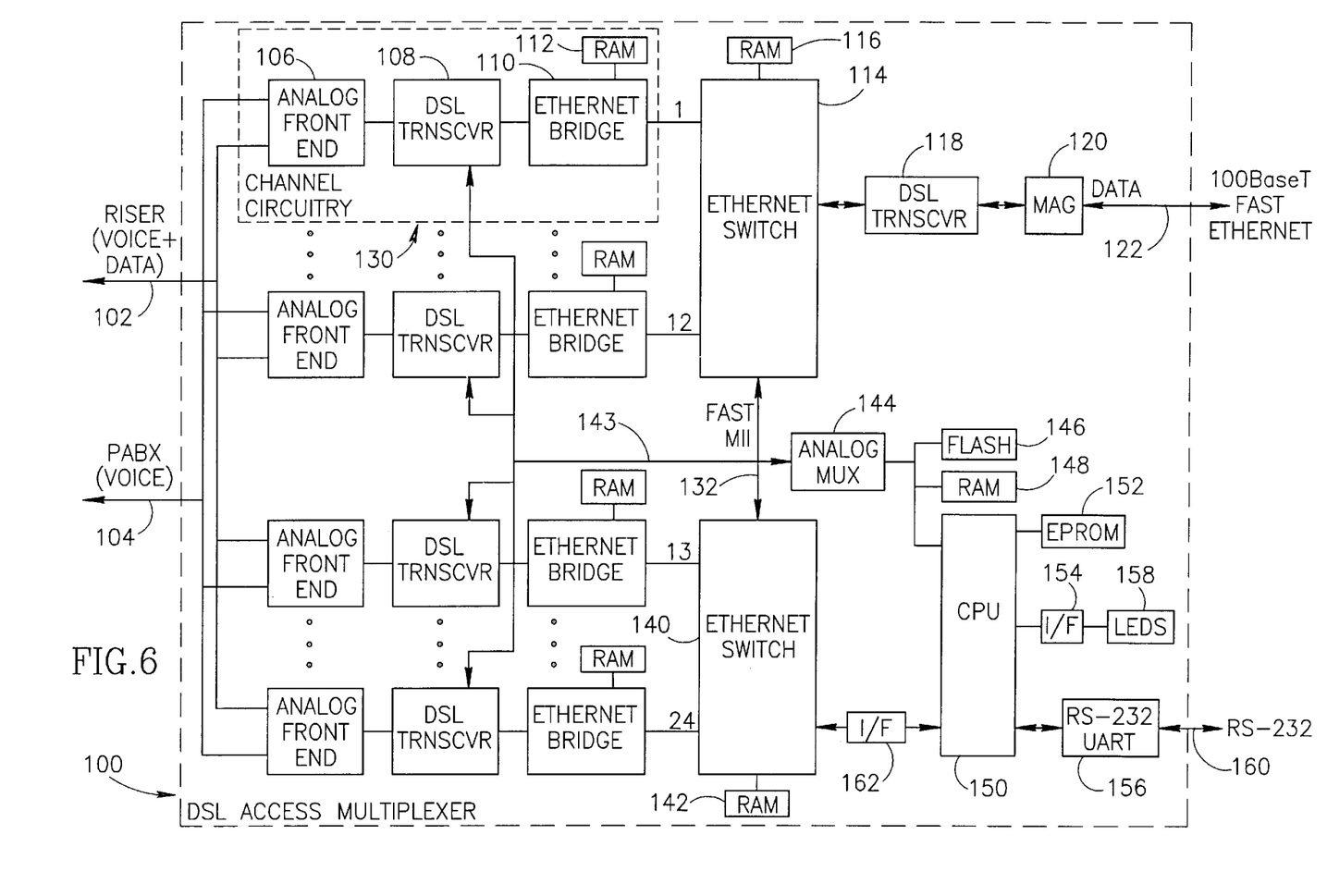
FIG. 6 is a block diagram illustrating the DSL Access Multiplexer (DSLAM) in more detail.

The Digital Subscriber Line Access Multiplexer (DSLAM) of the present invention will now be described in more detail. A block diagram illustrating the DSL Access Multiplexer (DSLAM) in more detail is shown in FIG. 6. The VDSL facility transport system comprises an Ethernet to VDSL Consumer Premises Equipment (CPE) coupled to a DSL Access Multiplexer (DSLAM) over a VDSL transport facility as illustrated in FIG. 1. The DSLAM is typically located at the curb or before the 'last mile' in a subscriber loop.

As described previously, the DSLAM 20 functions to encapsulate and extract Ethernet frames into and from HDLC frames from a plurality of channels. The DSLAM is adapted to receive HDLC frames from a number of channels, extract Ethernet frames therefrom and generate a standard Ethernet signal subsequently input to an Ethernet switch. In the opposite direction, the DSLAM is adapted to receive standard Ethernet frames from an Ethernet input signal and encapsulate them in HDLC frames for transmission over the VDSL facility to any of the attached channels.

The DSLAM typically is adapted to generate a plurality of VDSL streams to be transmitted over a plurality of VDSL facility channels #1 through #M. The VDSL signal received over each VDSL channel is processed by independent channel circuitry 130. Each channel circuit 130 comprises an analog front end 106, VDSL transceiver 108 and Ethernet bridge 110 with associated RAM 112 for performing conversion between Ethernet and HDLC. The DSLAM also comprises, Ethernet switches 114, 140, Ethernet transceiver 118, magnetics/PHY circuitry 120, analog multiplexer 144, Flash memory 146, RAM 148, interface 162, CPU 150, EPROM 152, interface 154, LEDs 158, RS-232 UART 156 and RAM 116, 142. In the example presented herein, M is equal to 24, with each Ethernet switch 114, 140 providing 12 ports each.

The analog front end 106, VDSL transceiver 108 and Ethernet bridge 110 function similarly to the analog front end 88, VDSL transceiver 86 and Ethernet/HDLC converter 84 described in connection with FIG. 5, therefore a description of these elements will not be repeated here.

The analog front end 106 comprises splitter/combiner circuitry to split the combined voice+data signal 102 into separate voice and data signals. The data signal is forwarded to the VDSL transceiver 108 while the voice is forwarded to the PBX via signals 104. A difference between the DSLAM and the CPE is that in the DSLAM, the VDSL ports (voice+data) and the POTS ports (voice only) are physically connected via RJ-21 connectors. The VDSL ports are connected to a raiser RJ-21 connector while the POTS ports are connected to the PBX RJ-21 connector.

A VDSL transceiver suitable for use in constructing the DSLAM of the present invention comprises the BCM6020 VDSL Transceiver manufactured by Broadcom Corporation, Irvine, Calif. or a VDSL modem manufactured by Savan Communications Ltd., Netanya, Israel.

An Ethernet/HDLC converter suitable for use with the present invention comprises the RJ-017 ChipBridge manufactured by Rad Data Communications Ltd., Israel. The RJ-017 ChipBridge is a full remote Ethernet bridge with an Ethernet interface on one side and an HDLC controller on the other. The chip performs full HDLC bit stream conversion, zero bit insertion/deletion, bit rate adaptation and provides an Ethernet front end.

The DSLAM comprises integral Ethernet switching means implemented in the example presented herein as two Ethernet switch chips each accommodating 12 10BaseT Ethernet ports and one 100BaseT port. The Ethernet switch ICs are connected so as to be capable of switching at Fast Ethernet speeds between all 24 VDSL channels and the 100BaseT Fast Ethernet port 122. The two switch chips are connected to each other to permit the transfer of frames between. The connection is implemented using a back to back standard fast MII interface 132 operating at a clock speed of 40 MHz thus enabling a data rate of 160 Mbps. A suitable switch for use with the present invention is the GT48212 Switched Ethernet Controller manufactured by Galileo Technology, San Jose, Calif.

The processing unit or CPU 150 communicates with the 24 DSL transceivers 108 via an analog multiplexer 144. Standard I$^2$C communication protocol is used to link the CPU directly with the DSL transceivers. The 24 transceivers are grouped into six groups of four each. Two analog multiplexers are provided for the I$^2$C clock and bi-directional data signals. Each analog multiplexer selects one of six groups (or banks) of transceivers while the I$^2$C protocol provides addressing for four transceivers within a group.

The CPU has associated Flash memory 146 for storing the application firmware and system RAM 148. In this example embodiment, the RAM may comprises 1M×16 SDRAM and the CPU may comprise the Motorola MPC850 or MPC860 PowerQUICC series of microcontrollers manufactured by Motorola, Schaumburg, Ill. Note that one skilled in the art can apply the principles of the present invention to other microcontrollers or microprocessors as well.

The CPU has associated components including EPROM (e.g., serial EPROM) 152 for storing configuration information such as the hardware revision, MAC address, etc., a programmable logic device (PLD) interface 154 to indicators 158 such as LEDs and an interface to a RS-232 Universal Asynchronous Receiver/Transmitter (UART) 156 connected to an RS-232 port 160. Typically the DSLAM comprises 24 LEDs, each LED associated with a VDSL channel. Each LED may have three states: off—no VDSL link between the CPE and the DSLAM; on—VDSL link is OK but no traffic; and blinking—VDSL traffic exists. The Ethernet LEDs are connected to and driven directly by the Ethernet PHY circuits. The RS-232 port is used for monitoring, status, control, management of the DSLAM and for downloading updated versions of software.

The CPU 150 communicates with both switches 114, 140 via a MII to 7 wire interface circuit 162. Communications with Ethernet switch 114 occurs over the Fast MII interface 132. The interface circuit may be implemented using a suitably configured standard PLD. The CPU manages both switches via this interface and the fast MII interface 132.

On the Fast Ethernet side, the DSLAM comprises a 100BaseT Fast Ethernet port 122 at the back end, magnetics module 120 and an Ethernet physical layer transceiver 118 connected to switch 114. The magnetics 120 and PHY transceiver 118 function similarly to the magnetics 80 and PHY transceiver 82 described in connection with FIG. 5. The transceiver 118 may comprise the BCM5201 10/100BaseTX Mini-PHY Transceiver manufactured by Broadcom Corporation, Irvine, Calif. The PHY layer transceiver 118 functions to perform the physical layer signaling (PLS) and Media Attachment Unit functions as defined by the IEEE 802.3 specification for use with 10BaseT and 100BaseT Ethernet networks.

The Ethernet bridges 110 function to encapsulate the Ethernet frame data output from each of the ports of the switches into HDLC frames and forward them to their respective VDSL transceivers 108. The VDSL transceivers modulate the HDLC frame data and generate a signal that is the input to the analog front end 106. The output of the analog front end is a VDSL signal suitable for transmission over the twisted wire pairs 102 to the CPEs. Note that the HDLC signal may be transmitted using the 10BaseS transport facility described above.

In the VDSL to Ethernet direction, for each channel, VDSL signals, e.g., 10BaseS signals, are received by the analog front end and output to the VDSL transceiver. Each VDSL transceiver functions to demodulate the signal received over the twisted pair wires 102 and output HDLC frames to Ethernet bridge. The Ethernet bridge functions to extract the Ethernet frame data encapsulated within the HDLC frame and generate standard Ethernet frames, which are then input to the corresponding port on one of the Ethernet switch chips. If the Ethernet frames are destined to the Fast Ethernet port, the switches forwards the Ethernet frames to the PHY transceiver 118 for transmission over the 100BaseT port 122 via the magnetics module 120. Alternatively, the Ethernet frames may be transmitted to a 100BaseFX port via an optical transceiver.

Note that one skilled in the art could implement the CPE and DSLAM devices of the present invention using different components without departing from the sprit and scope of the present invention.

Figure 7:
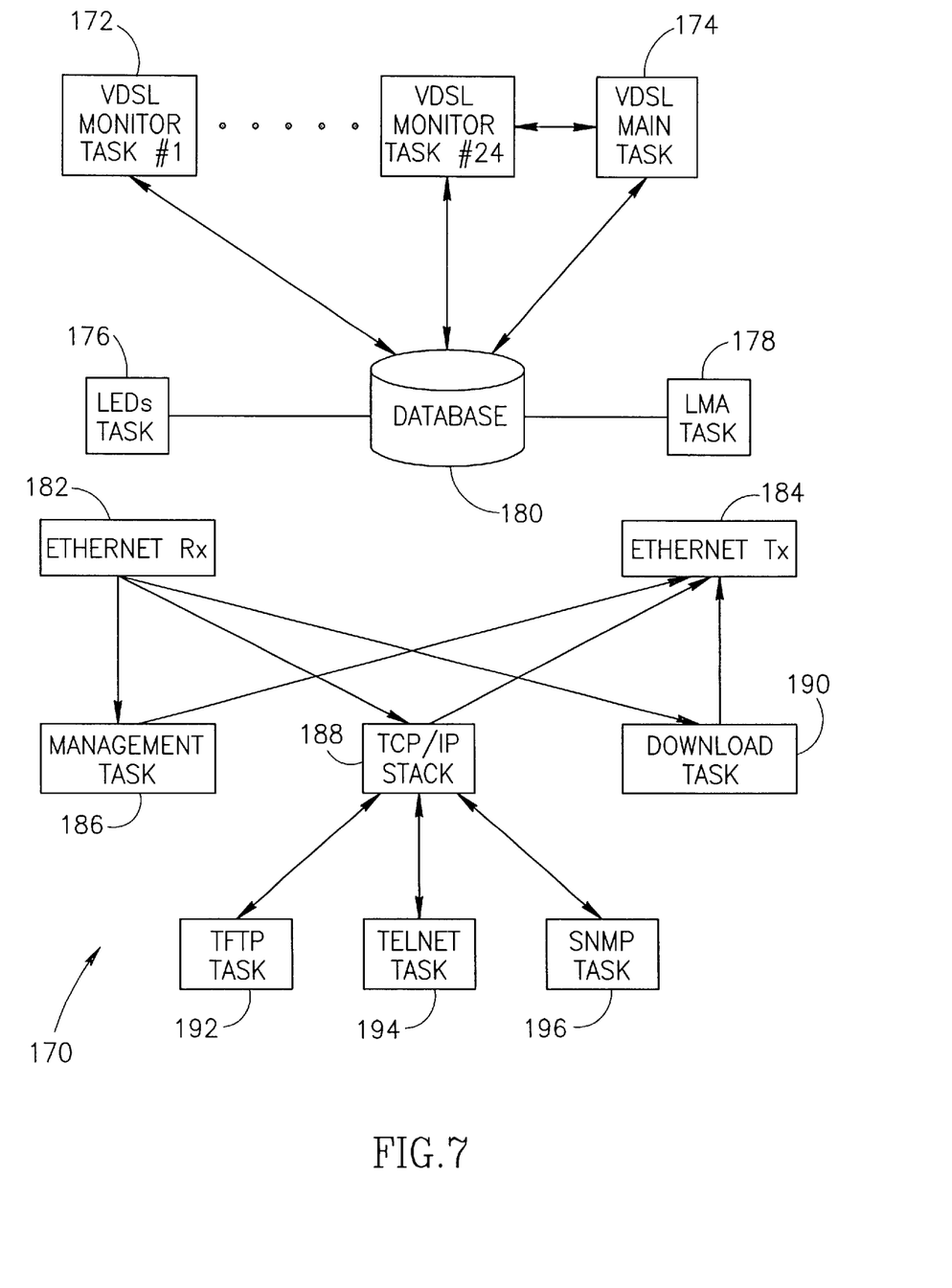
FIG. 7 is a block diagram illustrating the software tasks performed by the processing means incorporated into the DSLAM.

The software tasks performed in the DSLAM will now be described in more detail. A block diagram illustrating the software tasks performed by the processing means incorporated into the DSLAM is shown in FIG. 7. The software in the DSLAM is executed on the CPU 150 (FIG. 6). The software is comprised of a plurality of tasks, generally referenced 170, that together perform the functions and tasks of the DSLAM.

The VDSL main task 174 is responsible for the link establishment of the 24 VDSL ports. This task is assigned one of the highest priorities and is activated by the VDSL monitors tasks 172 each time a link is to be established for a particular port. This task executes concurrently with other tasks and records port status and VDSL link parameters to the database 180 after establishing a link. A VDSL queue is used to communicate messages to and from other tasks. Any of the 24 VDSL monitor tasks may send messages to the VDSL queue in the event a connection is lost. The message comprises the port number of the lost connection and the type of restart, i.e. cold or warm.

The VDSL task is operative to check the VDSL queue for messages. If there are no messages, the task is suspended until a message arrives. Cold or warm starts are performed in accordance with the parameters in the message. The results are then checked, and if the connection was unsuccessful, the task decides whether to attempt re-establishment on the same port or attempt establishment of a connection with the next port waiting in the queue. If successful, an indication is sent in a message to the corresponding VDSL monitor task.

The VDSL monitor tasks 172 comprise 24 monitor tasks, labeled monitor task #1 through #24. The monitor tasks control the synchronization of the VDSL channels. Each task is associated with a corresponding VDSL port. Each task checks the VDSL line status of its corresponding port and, in the event synchronization is lost, a message is sent to the VDSL main task. The message comprises the port number and the type of restart: either cold or warm. The task also updates the parameters in the database 180 and then suspends itself and waits for an event. The event message is sent from the VDSL main task after the connection is reestablished.

Figure 8:
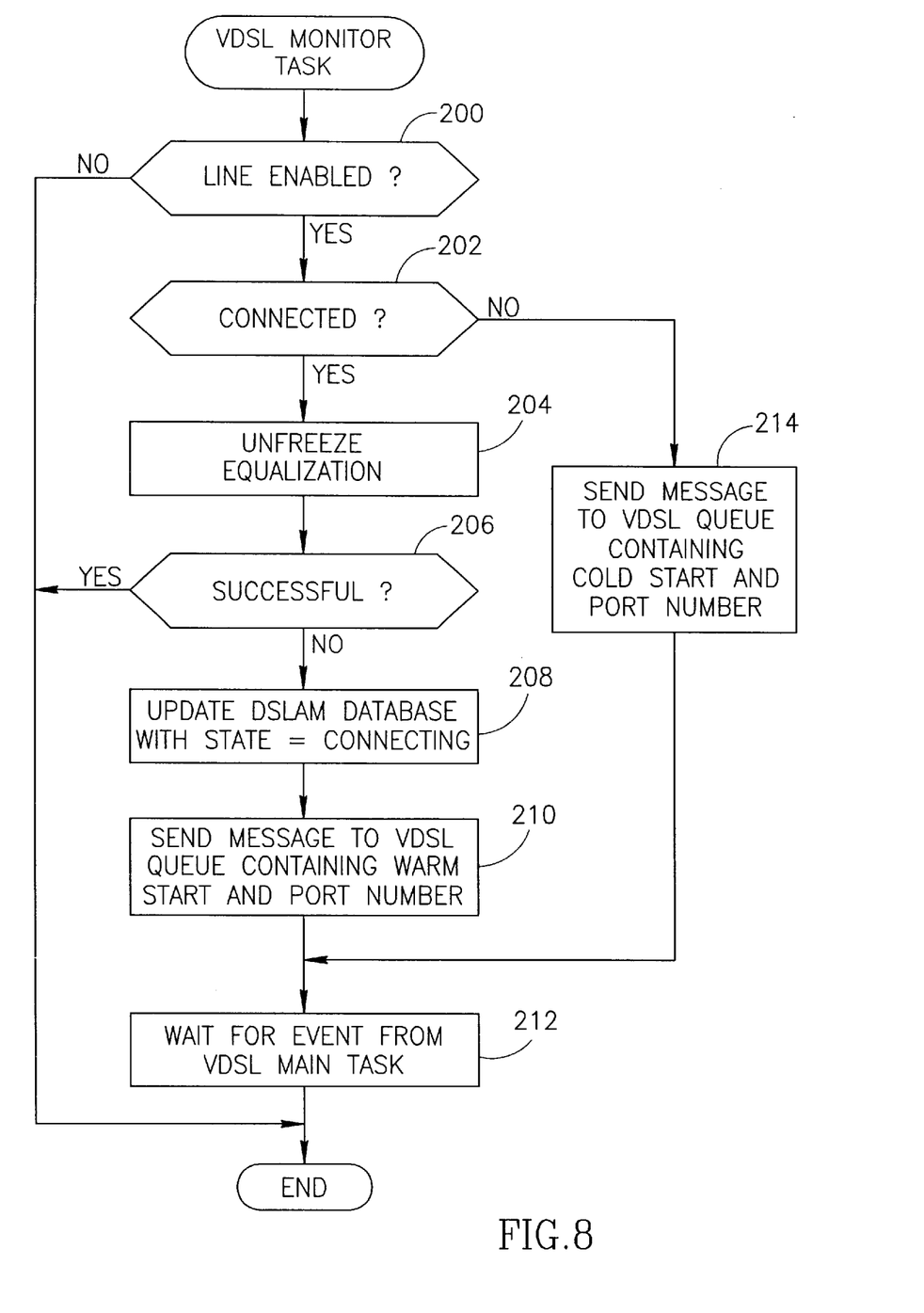
FIG. 8 is a flow diagram illustrating the VDSL monitor task of the present invention.

A flow diagram illustrating the VDSL monitor task of the present invention is shown in FIG. 8. First, it is checked whether the particular VDSL channel is enabled (step 200). If it is, it is checked whether it is connected (step 202). If it is not, a message is sent to the VDSL queue containing the port number and a restart type of 'cold start' (step 214). If the line is connected (step 202), the equalization process is unfrozen (step 204).

During operation of the system, the Feed Forward Equalization (FFE) is frozen (i.e. the equalization process is suspended). This is done to improve the performance of the system in the presence of impulse noise. Receiving a large impulse noise burst during the equalization process may cause the equalizer to diverge and the system may lose lock. It is desirable, however, to unsuspend the equalizer on a periodic basis since the channel and noise conditions change over time and the receiver should be permitted to track these changes. The equalizer is preferably unfrozen at a time during which if there is a low probability of receiving large impulse noise.

If it is successful (step 206), the DSLAM database is updated with the state=CONNECTING (step 208). A message is sent to the VDSL queue containing the part number and a restart type of 'warm start' (step 210). The task is then suspended until an event from the VDSL main task occurs (step 212).

The DSLAM database 180 is an information database comprising a static array having the following main elements:

1. CPE structure;
2. DLSAM general information structure;
3. DSLAM VDSL structure;
4. DSLAM ports structure;
5. SWITCH structure.

The CPE Structure comprises the main elements of the CPE database and is an array of 24 entries arranged according to DSLAM port number. The entries comprise related elements such as restart counter, symbol rate, constellation, hit rate, SNR, etc. The DSLAM general information structure comprises the version information and IP configuration information. The DSLAM VDSL structure comprises the information related to all 24 VDSL ports, e.g., status information, etc. The DLSAM port structure comprises general port information including traffic counters and port configuration data such as MAC address, user IP address, etc. The SWITCH structure comprises switch related information such as traffic counter for each port of the switch and configuration parameters associated with each switch.

The Ethernet Rx task 176 and Tx task 184 provide the Ethernet communication channel for the applications in the system. Both are assigned high priority and may be preempted by VDSL tasks. The Ethernet Rx task is activated periodically, e.g., every 0.5 seconds and is operative to retrieve received Ethernet. frames from the hardware and dispatch them to the appropriate application, e.g., TFTP, SNMP, management or downloading. The Rx task uses the messaging mechanism to communicate with other applications.

The Tx task is operative to wait for messages from other applications to arrive in its queue (i.e. mailbox) and is activated for execution only upon the arrival of a message. Note that the Tx task queue should be large enough to hold at least 10 messages (each being 1,500 bytes long) at the same time. The task is run until the queue is emptied. Each frame taken from the queue is transferred to an Ethernet driver and transmitted by hardware to the channel.

The management task 186 is assigned medium priority and may be activated by a timer service routine from the operating system or via a message sent by the Ethernet Rx task. The action taken by the management task depends on the reason for the task's activation. If a message has arrived, the task is operative to parse the message and modify the contents of the database using the parameters in the message, e.g., status and counter information, changes in port state, etc. If a timer event occurred, the task begins a round of polling each VDSL channel. A poll request is only sent to those VDSL channels that are in the VDSL CONNECTED state. The channel responds to such a request with an appropriate reply message. Once all the channels are polled, the task is suspended.

The downloading task 190 is responsible for performing software downloading from the Flash storage memory to all the VDSL modems (channels) in the DSLAM. This task is assigned medium priority and is activated by a system call from the operating system, the LMA, LMA over Telnet or SNMP tasks. Once awakened, the management task performs the downloading process using the capabilities of the switch (e.g., the Galileo switches) to distribute frames to some or all of the modems that are in the VDSL CONNECTED state. The task transmits new version information via the Ethernet Tx tasks. Once all the frames are downloaded and the process is complete, an acknowledgement is received via the Ethernet Rx task. Once an acknowledgement is received from all downloaded modems, the task is suspended.

The Local Management Application (LMA) task 178 is responsible for providing the local user interface (UI) in the form of a set of menus displayed on a screen. The system comprises means for permitting a user to monitor and query the system to retrieve status, statistics and to perform debugging and diagnostic procedures. After initialization, the task is operative to wait for an input string to arrive in its associated mailbox. The message is sent from the RS-232 UART receive interrupt handler. For each string received in the mailbox, the task pares the string and performs the requested action. The task then waits for the next string to arrive.

The LMA task is assigned low priority and is awakened by an event from the RS-232 receiver interrupt handler portion of the operating system. The LMA task is also operative to perform remote CPE diagnostic and configuration actions. The message is built using an appropriate protocol between the CPE and the DSLAM. The message is then sent using the Ethernet Tx task.

The LEDs task 176 is assigned low priority and is activated periodically by the operating system at a suitable rate, e.g., once each second. The LEDs task is similar to that implemented in the CPE and its main function is to illuminate the appropriate LED associated with the VDSL channel as a link indication for the port. In addition, the LEDs task functions to blink the appropriate LED to indicate the existence of traffic on a port. The decision to turn an LED on is based on the information in the database that is updated by the VDSL tasks. The decision to blink an LED for a port is based on checking the Rx and Tx frame counters for the particular port which are also available in the database.

The software also comprises a TCP/IP task 188, Tiny File Transfer Protocol (TFTP) task 192, Telnet task 194 and SNMP task 196, each of which are well known functions to those skilled in the software and networking arts.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A Digital Subscriber Line Access Multiplexer (DSLAM) apparatus for use in an Ethernet over Very high speed Digital Subscriber Line (VDSL) transport facility, said DSLAM connected to a plurality of Customer Premise Equipment (CPE), each CPE connected to said DSLAM via a separate VDSL channel, comprising:

a plurality of channel circuits, each channel circuit corresponding to a channel and comprising:

an Ethernet bridge adapted to encapsulate entire Ethernet frames within High level Data Link Control (HDLC) frames and to extract Ethernet frames from HDLC frames received over said VDSL transport facility;

a VDSL transceiver adapted to transmit HDLC frames over said VDSL transport facility, wherein HDLC frames are transmitted over said VDSL transport facility without regard to VDSL transmit and receive start of cell (SOC) signals;

an analog front end operative to provide a line interface to a VDSL channel;

an Ethernet switch having a plurality of ports, each port coupled to a channel circuit;

an Ethernet port coupling said Ethernet switch to an external Local Area Network (LAN);

a processor; and software means operative on said processor for controlling said plurality of channel circuits, said Ethernet switch and said Ethernet port.

2. The apparatus according to claim 1, wherein said analog front end comprises a line driver amplifier in the transmit direction and is operative to generate an analog VDSL signal for transmission onto a VDSL copper line.

3. The apparatus according to claim 1, wherein said analog front end comprises, in the reverse direction, an Automatic Gain Control (AGC) circuit, isolation transformer and hybrid filters and comprises an interface for receiving an analog VDSL signal from a VDSL copper line and for passing the signal through said AGC and said filters.

4. The apparatus according to claim 1, wherein said analog front end comprises a splitter for extracting a voice signal from a combined voice+data signal.

5. The apparatus according to claim 1, wherein said analog front end comprises a combiner for combining a voice signal with a data signal to form a combined voice+data signal.

6. The apparatus according to claim 1, wherein said Ethernet bridge is adapted to convert data received over said channel in High level Data Link Control (HDLC) format to standard Ethernet format.

7. The apparatus according to claim 1, wherein said Ethernet bridge is adapted to convert data in standard Ethernet format to High level Data Link Control (HDLC) format for transmission over said channel.

8. The apparatus according to claim 1, wherein said Ethernet switch comprises a plurality of switch integrated circuits connected to each other to permit communications therebetween.

9. The apparatus according to claim 8, wherein said plurality of switch integrated circuits are connected to each other utilizing a Media Independent Interface (MII) interface.

10. The apparatus according to claim 1, further comprising a plurality of Light Emitting Diodes (LEDs) for indicating status of each VDSL channel.

11. The apparatus according to claim 1, further comprising a communications port for management, debug and monitoring purposes.

12. The apparatus according to claim 11, wherein said communications port comprises an RS-232 port.

13. The apparatus according to claim 1, wherein said Ethernet port comprises a 100BaseT Fast Ethernet port.

14. The apparatus according to claim 1, wherein said Ethernet port comprises a 100BaseT Fast Ethernet PHY transceiver and associated magnetics.

15. The apparatus according to claim 1, further comprising a database for storing CPE, VDSL channel and VDSL port related information.

16. The apparatus according to claim 1, wherein said software means comprises a plurality of VDSL monitor tasks, each VDSL monitor task associated with a channel.

17. The apparatus according to claim 1, wherein said software means comprises a VDSL main task.

18. The apparatus according to claim 1, wherein said software means comprises an LED task.

19. The apparatus according to claim 1, wherein said software means comprises a Local Management Application (LMA) task.

20. The apparatus according to claim 1, wherein said software means comprises an Ethernet Rx task.

21. The apparatus according to claim 1, wherein said software means comprises an Ethernet Tx task.

22. The apparatus according to claim 1, wherein said software means comprises a management task.

23. The apparatus according to claim 1, wherein said software means comprises a downloading task.

24. The apparatus according to claim 1, wherein said software means comprises a TCP/IP communications task.

25. The apparatus according to claim 1, wherein said software means comprises a TFTP communication task.

26. The apparatus according to claim 1, wherein said software means comprises an SNMP task.

27. The apparatus according to claim 1, wherein said software means comprises a Telnet communication task.

28. A multiplexing device for providing network connectivity for the transport of High level Data Link Control (HDLC) frames to at least one subscriber over a Very high speed Digital Subscriber Line (VDSL) transport facility, comprising:

means for providing a VDSL line interface to said at least one subscriber;

means for encapsulating entire Ethernet frames within High level Data Link Control (HDLC) frames and for extracting Ethernet frames from HDLC frames received over said VDSL transport facility;

means for transmitting HDLC frames over said VDSL transport facility, wherein HDLC frames are transmitted over said VDSL transport facility without regard to VDSL transmit and receive start of cell (SOC) signals; and switching means adapted to switch Ethernet frames received over said VDSL transport facility between said at least one subscriber and an external Ethernet network coupled to said multiplexing device.

29. A method of providing network connectivity for the transport of High level Data Link Control (HDLC) frames to at least one subscriber over a Very high speed Digital Subscriber Line (VDSL) transport facility, said method comprising the steps of:

providing a VDSL line interface to said at least one subscriber;

encapsulating entire Ethernet frames within High level Data Link Control (HDLC) frames and for extracting Ethernet frames from HDLC frames received over said VDSL transport facility;

transmitting HDLC frames over said VDSL transport facility, wherein HDLC frames are transmitted over said VDSL transport facility without regard to VDSL transmit and receive start of cell (SOC) signals; and switching Ethernet frames received over said VDSL transport facility between said at least one subscriber and an external Ethernet network.

\* \* \* \* \*